June 10, 1941. E. L. ELWELL 2,245,071
BASKET FOR CENTERING, FILLING, PINNING, AND DIPPING ICE CREAM CONES
Filed Aug. 14, 1940 3 Sheets-Sheet 1
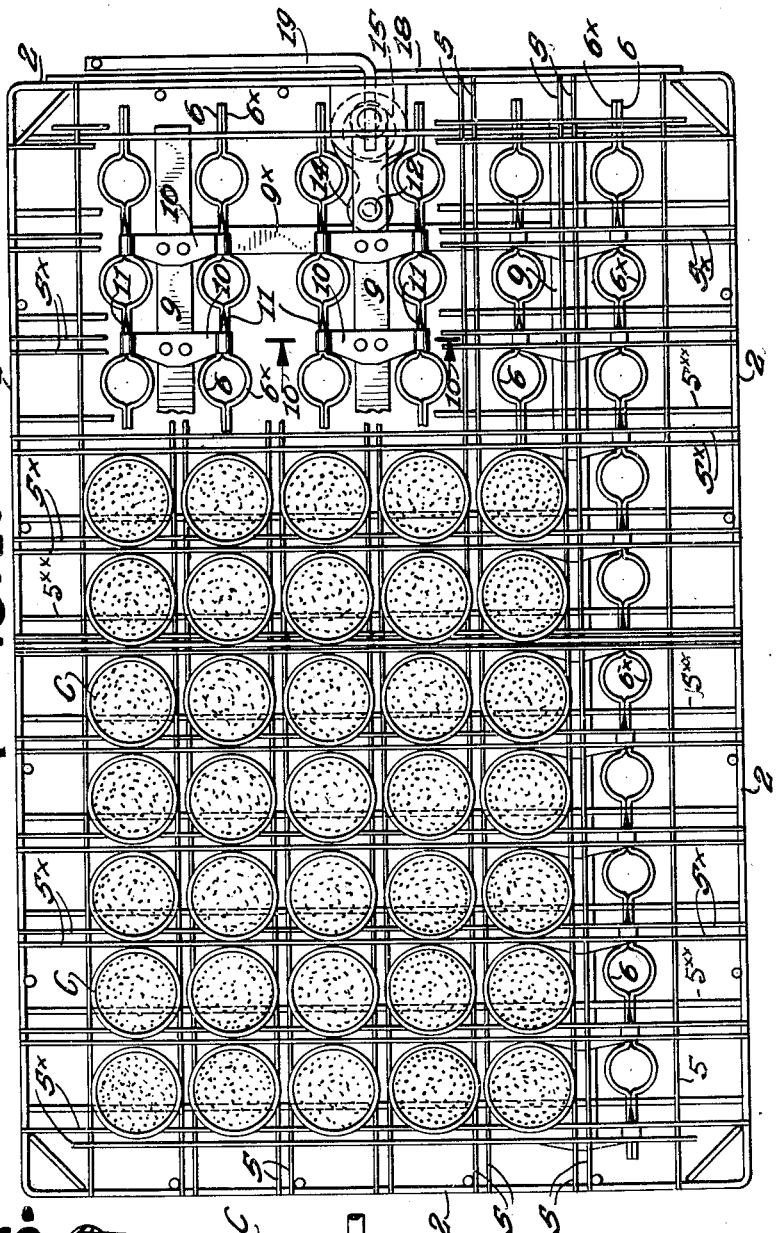
INVENTOR.
Edwin L. Elwell
H. Lee Helms
BY,
ATTORNEY.

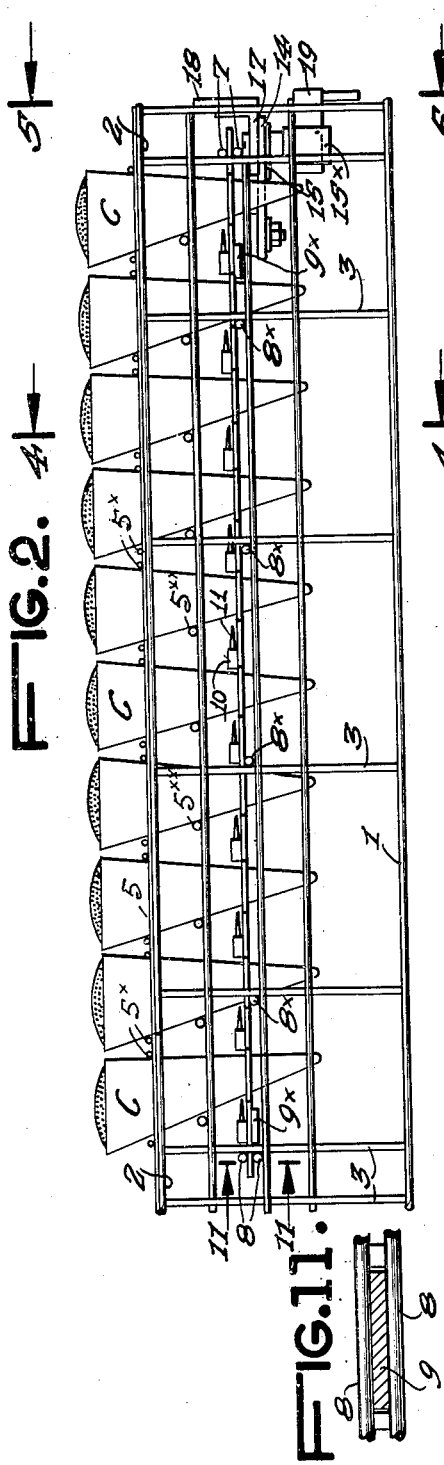

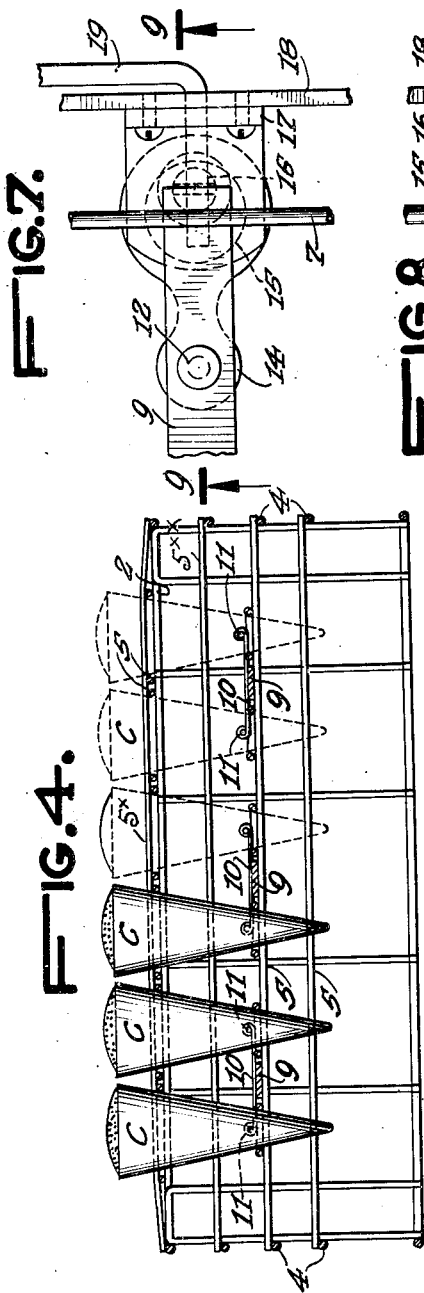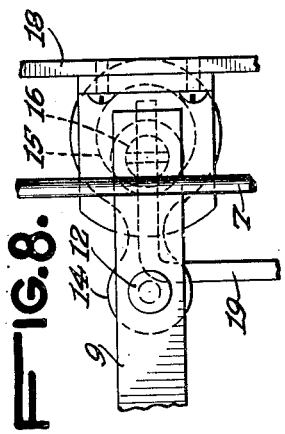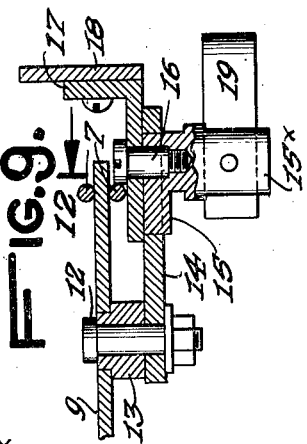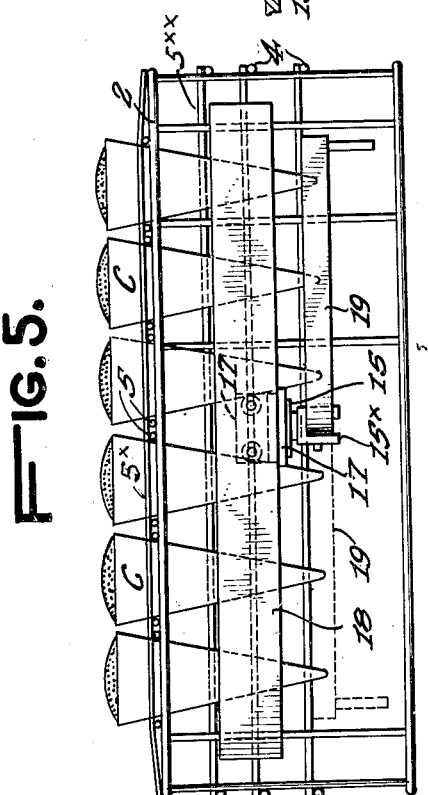

Patented June 10, 1941

2,245,071

UNITED STATES PATENT OFFICE 2,245,071

BASKET FOR CENTERING, FILLING, PINNING, AND DIPPING ICE CREAM CONES

Edwin L. Elwell, Baltimore, Md., assignor to Eskimo Pie Corporation, Bloomfield, N. J., a corporation of Delaware Application August 14, 1940, Serial No. 352,580

5 Claims. (Cl. 294—87)

The object of the present invention is to provide a single instrumentality, in the form of a basket, by means of which a large number of the usual baked pastry cones may be centered, filled with ice cream, pinned, and dipped in chocolate. The basket may then be placed in a hardening room for hardening of the ice cream and for further hardening of the chocolate coating. Preliminary to such hardening the chocolate coating, before solidification by the cold of the ice cream itself, may be sprinkled with ground nuts or other edible material. The result of the invention is that the filling, coating and completion of ice cream cones may be greatly expedited by apparatus simple and inexpensive in character and which may accompany the cones in the various steps until they are completed.

The invention will be described with reference to the accompanying drawings, in which:

Figure 1 is a plan view, partly broken away, showing an embodiment of the invention, a plurality of cones being shown in position.

Figure 2 is a view of the embodiment in side elevation.

Figure 3 is a view similar to Figure 2, showing the basket inverted, and the projecting ice cream of the cones dipped into chocolate or other coating liquid held within a container therefor.

Figure 4 is a transverse sectional elevation taken generally on the line 4—4, Figure 2.

Figure 5 is an end elevation taken at the end indicated by 5—5, Figure 2.

Figure 6 is a vertical section through a filled and coated cone and the pin area of the basket showing the pin in holding position.

Figure 7 is a plan view, somewhat schematic, showing the position of the pin-actuating cam and immediate connections when the pins are in inactive position.

Figure 8 is a view similar to Figure 7, showing the position of the parts shown in Figure 7 when the pins are in active position.

Figure 9 is a sectional elevation taken on the line 9—9, Figure 7.

Figure 10 is an enlarged fragmentary section taken on the line 10—10, Figure 1.

Figure 11 is an enlarged fragmentary section taken generally on the line 11—11, Figure 2.

Referring to the drawings, the basket comprises a lower rectangular frame member 1 of heavy wire and the corresponding upper frame member 2, connected by vertical wire members 3 and reinforced by any suitable number of intermediate wire members 4 at the sides and ends of the basket. In general practice, the wire frame members are welded together. Carried by the top end frame members 2 are a plurality of spaced sets of separation wires 5, each set preferably comprising two wires. Extending transversely of the basket and lying over upon the sets of separation wires 5 are transversely extending sets of separation wires 5x. The two sets of separation wires provide between them rows of rectangular recesses, for rows of cones C.

The cones toward their lower end are received and centered by ring members arranged in rows corresponding to the cones and each ring member comprising, in the present embodiment, two adjacent wires 6, 6x, Figure 2, which at spaced sections are bent into U-formation, the U-formation of one wire extending in a direction opposite to that of the second wire, the wires being welded or otherwise secured together. The wires are supported at the front end of the basket by welding or soldering to cross wires 7 and at the rear of the basket by similar connection to cross wire 8, intermediate support being given by the transverse wires 8x. Extending longitudinally of the basket are three slide bars 9, each bar lying between two of the ring members 6, 6x. The slide bars are connected by underlying transverse bars 9x. Each slide bar 9 carries a pin-holding plate 10 carrying at each end a pin 11, for each two of the cone-receiving rings, as shown more particularly in Figures 1 and 10.

The center slide bar of the three bars is connected with means for moving the pins into and out of engagement with the cones C. To this end the said slide bar is connected by means of stud 12 and spacer disk 13 with link 14 which is apertured to receive an eccentric 15 pivoted at 16 upon a bracket arm 17, the latter being supported by a plate 18 welded or otherwise secured to the basket end.

The eccentric 15 is formed with a depending shaft-like end 15x slotted to receive the bent end of an operating lever 19. When the lever is swung from its position of Figure 7 to the position shown in Figure 8, eccentric 15 acts to move slide bars 9 in such position as to carry the pins 11 into the cones as shown in Figure 6. A reverse movement of lever 19 will retract the pins.

In addition to the supporting area for the cones provided by the longitudinal wires 5 and the transverse wires 5x, with the underlying rings provided by the wires 6 and 6x, an additional set of longitudinal and transverse guide wires may be provided, if desired, the transverse wires being indicated at 5xx, Figures 2 to 5 inclusive.

In operating the basket, the unfilled cones are placed in their respective apertures so that the lower ends are held in the ring provided by wires 6 and 6x. In the present embodiment, 60 cones may thus be held. The basket is then placed under a filling machine and the cones filled with a frozen confection material such as ice cream. If desired the basket may then be placed for a brief period in a hardening room, although in some cases this will be unnecessary. The basket may then be inverted after lever 10 is operated to pin the cones. The inverted basket is then used as a dipping rack in the manner shown in Figure 3, the projected ice cream ends of the cone being dipped into chocolate held within a suitable container such as the container 20. After the dipping operation, ground nuts or other edible material may be applied to the chocolate coating if desired. The basket may be then taken to the hardening room and by reason of its form another basket may be placed on top thereof, and a plurality of the baskets stacked for the hardening operation.

It will be seen from the above that the filling, coating and completion of ice cream cones is greatly expedited by an inexpensive basket device which accompanies the cones through the various steps of filling, coating and hardening until all of the operations are completed.

Having described my invention, what I claim and desire to secure by Letters Patent, is as follows:

1. A basket for centering, filling, pinning and dipping ice cream cones, comprising a frame, a plurality of superposed guiding and receiving members for the cones providing rows of cone-receiving recesses adapted to support and center the cones in successive rows and with their tops exposed above the basket for simultaneous filling with a frozen confection material, a pin for each cone, the pins being carried by and movable relatively to the basket, and means for simultaneously moving a plurality of the pins into and out of cones to pin the same to the basket, whereby the basket with filled cones may be inverted for a dipping operation.

2. A basket for centering, filling, pinning and dipping ice cream cones, comprising a frame, a plurality of superposed guiding and receiving members for the cones providing rows of cone-receiving recesses adapted to support and center the cones in successive rows and with their tops exposed above the basket for simultaneous filling with a frozen confection material, a plurality of pin carriers, each holding two pins, one at each end, the pin carriers being arranged in parallel rows, a slide bar for connecting the pin carriers of each row, connecting means for said slide bars and a lever device for bodily moving said connecting means in opposite directions, whereby the pins are simultaneously moved into and out of the cones to pin the same to the basket, whereby the basket with filled cones can be inverted for a dipping operation.

3. A basket for centering, filling, pinning and dipping ice cream cones constructed in accordance with claim 2, in which the means for bodily moving the pin carriers comprises an eccentric, a lever carried by the eccentric and adapted to initially lie flat against one wall of the basket, a sleeve embracing the eccentric and carrying a link arm, and means connecting the link arm with a member of the connected pin assembly.

4. A basket for centering, filling, pinning and dipping ice cream cones constructed in accordance with claim 1, in which the guiding and receiving members for the cone include a plurality of sets of wires extending in generally parallel relationship, each set comprising two wires and the wires of a set being formed with oppositely directed U-bends providing cone-receiving rings.

5. A basket for centering, filling, pinning and dipping ice cream cones, comprising a frame, a plurality of superposed guiding and receiving members for the cones providing rows of cone-receiving recesses adapted to support and center the cones in successive rows and with their tops exposed above the basket for simultaneous filling with a frozen confection material, a pin for each cone, the pins being carried by and movable relatively to the basket, and means for simultaneously moving a plurality of the pins into and out of cones to pin the same to the basket, whereby the basket with filled cones may be inverted for a dipping operation, the basket being formed with a depending skirt area whereby two baskets holding the filled and dipped cones may be superposed, the skirt area of the overlying basket embracing without contacting the upwardly projected cones of an underlying basket, adapting a plurality of the filled baskets to be stacked for simultaneous hardening of the frozen confection material held by the cones.

EDWIN L. ELWELL.